United States Patent [19]

Shah

[11] Patent Number: 5,753,799
[45] Date of Patent: May 19, 1998

[54] LIFE CYCLE TESTING OF SWIVEL JOINTS

[75] Inventor: Jayesh Shah, Owings Mills, Md.

[73] Assignee: Assen Exports, Inc., Owings Mills, Md.

[21] Appl. No.: 738,019

[22] Filed: Oct. 25, 1996

[51] Int. Cl.$^6$ .................. G01N 19/08; F01D 3/00; G01M 3/28
[52] U.S. Cl. .................. 73/40; 73/46; 73/49.8
[58] Field of Search .................. 73/40, 49.8, 49.7, 73/46

[56] References Cited

U.S. PATENT DOCUMENTS

| | | | |
|---|---|---|---|
| 1,379,961 | 5/1921 | Chilton. | |
| 3,167,964 | 2/1965 | Dega et al. | 73/432 |
| 3,332,277 | 7/1967 | Blinder | 73/67 |
| 3,400,580 | 9/1968 | Haren et al. | 73/119 |
| 3,580,059 | 5/1971 | Dalton | 73/71.5 |
| 3,911,725 | 10/1975 | Selivanov et al. | 73/15.4 |
| 3,987,663 | 10/1976 | Repella | 73/46 |
| 4,345,642 | 8/1982 | Ernst et al. | 165/86 |
| 4,448,080 | 5/1984 | Dressel et al. | 73/799 |
| 5,083,471 | 1/1992 | Ehret | 73/865.9 |
| 5,382,856 | 1/1995 | Keck et al. | 310/71 |
| 5,383,351 | 1/1995 | Kotlyar | 73/40 |
| 5,412,977 | 5/1995 | Schmohl et al. | 73/46 |
| 5,448,924 | 9/1995 | Nagai et al. | 73/865.9 |
| 5,461,903 | 10/1995 | Harms | 73/40 |

*Primary Examiner*—Hezron E. Williams
*Assistant Examiner*—J. David Wiggins
*Attorney, Agent, or Firm*—Leonard Bloom

[57] ABSTRACT

In a method for life cycle testing of a swivel joint having male and female conduit elements, a fluid is supplied to the swivel joint under a predetermining pressure; and a certain mechanical load is applied to the swivel joint under test, thereby simulating typical operating conditions. While maintaining one of the conduit elements of the swivel joint immovable, the other conduit element is rotated continuously for a predetermined number of rotational cycles corresponding to a calculated life cycle. The direction of rotation is periodically reversed after a predetermined time period. The swivel joint is continuously checked for an undesirable leakage. A test setup for the life cycle testing is provided.

33 Claims, 6 Drawing Sheets

LIFE CYCLE TESTING OF SWIVEL JOINTS

FIELD OF THE INVENTION

The present invention relates to the testing of swivel joints, and more particularly, to a method and a test apparatus (setup) for life cycle testing of swivel joints employed in fuel handling articulated equipment.

BACKGROUND OF THE INVENTION

Swivel joints are widely used in fluid handling equipment for oil, gas and petrochemical industries. There is a variety of diversified swivel joints, such as flanged, threaded, butt weld, with roller and/or ball bearings, etc., made of carbon steel, stainless steel, aluminum or bronze, employed in loading/unloading systems, for the aviation industry, floating roof tank drains, floating suction assemblies, hose assemblies, oil drilling industry, and so on.

These swivel joints comprise two or three relatively rotating pieces with ball and/or roller bearings therebetween. The parts of the swivel joint are sealed to prevent leakage of the fluid (oil, gas, petrochemicals). The bearings are either lubricated for the life of the swivel joints or require periodic lubrication.

It is extremely important for the users of swivel joints to know for how long (and under a certain load requirement) an installed swivel joint will function with no reliability problems. In other words, the user wants to know the rated life cycle of the swivel joint, when the swivel joint has to be replaced, how often periodic lubrication needs to be performed, etc. Conversely, the manufacturer of the swivel joints (for warranty purposes) must know the life of the swivel joint before it fails, i.e., before leakage occurs.

From a manufacturer's standpoint, knowing the life cycle of a swivel joint has a two-fold importance. The first is, economical; that is, the longer a guarantee or warranty may be provided for a certain swivel joint, the better the performance, and hence improved marketability. Second, on the basis of studying the life cycle, design improvements can be made in the swivel joint and, ultimately, in the fluid handling equipment.

Several methods and apparatuses for testing joints and parts thereof are taught in general industry.

For instance, U.S. Pat. No. 1,379,961 discloses the testing of universal joints for determining the transmission efficiency, the frictional losses, and similar physical data thereof. As understood by those skilled in the art, a universal joint connects two shafts with intersecting axes, and, in operation, the common plane of these intersecting axes is usually stationary while the shafts rotate. Under test, the joint is held from rotating and is flexed while so held. The setup includes three universal joints. Each of the end joints is held by a torque force against relative movements about their axes. A force is imposed on an offset end of the intermediate joint to rotate the common plane of the intersecting axes over a planetary path about the common axes of the end joints at a regulated speed, and the force is measured. This is not, however, a hydro-test.

For joints employed in fluid handling equipment, a test is of importance which would predict occurrence of a leakage in the seal.

A device for predicting such a failure has been disclosed in U.S. Pat. No. 5,448,924, according to which a behavior monitoring system for a rotary body monitors displacement of parts of the rotary body in a plurality of directions. This is not a hydro-test, however, and therefore does not provide a real working environment for a swivel joint to be tested.

Lip-seals are usually used in swivel joints. The lip-seal is an important part of a satisfactory performance of a swivel joint as a whole and, therefore, is to be tested.

U.S. Pat. No. 3,167,964 discloses testing of a seal quality, prior to the association of the seal with the joint member and, particularly, measuring the effect of centrifugal forces on lip-type seals employed in swivel joints.

The rig for testing includes a conventional stroboscope, a motor, and a test fixture having a test shaft. The flexible lip portion of the lip-seal is normally in peripheral engagement with the test shaft. When the motor is energized, the test fixture is driven to rotate, and the stroboscope emits a light beam. If the lip-seal is in mechanical engagement with the test shaft, no light will be seen through the test rig; in an opposite case, if any deflection of the flexible lip portions of the seal leaves a gap between the lip portion and the test shaft, the light will be seen, indicative of sealing loss. The pressure is measured by the centrifugal force necessary to cause the flexible lip to be moved radially outwardly out of engagement with the test shaft.

Another arrangement for testing a seal of the type having a radial shaft-engaging lip is disclosed in U.S. Pat. No. 3,987,663. A rotatable test shaft has an outer periphery preferably slightly smaller than the shaft for which the seal lip is designed, and the lip of the seal to be tested engages that periphery. The shaft centerline has a predetermined degree of offset from its own axis of rotation, so-that the seal lip is subjected to a predetermined shaft run out when the test shaft is rotated at a desired speed. A stationary means supports the seal in a normally leak-tight manner and cooperates with the test shaft and seal to provide a chamber. Air is sent under a desired pressure to the chamber, and it is determined whether there is leakage of air from the chamber.

A method and apparatus for leakage testing in the joints of an oil filter is disclosed in U.S. Pat. No. 3,400,580. The joint is sealed within a closed chamber. The interior of the joint is pressurized and a leakage is detected by sensing the changing of the pressure within the closed chamber that contains the joint.

None of the above methods and rigs provides, however, for a life cycle (operating life) testing of a swivel joint unit (as a whole) in real (normal) operating conditions.

In U.S. Pat. No. 3,911,725, life testing of electrohydraulic and hydromechanic units with a linear motion output member under conditions close to normal working conditions is disclosed. The method comprises the steps of establishing the delivery pressure and temperature of the working liquid maximum admissible for the unit being tested; and feeding a control pulse to the unit being tested, thereby imparting a cyclical reciprocatory motion to the output member of the unit. The amplitude and frequency which are constant during the tests correspond to the maximum available velocity of the unit being tested. An external load is applied to the output member of the unit which is determined on the basis of the equivalent accumulation of the fatigue damages in load-bearing members of the unit. The reciprocations of the output member continue for a testing time. The number of cycles and the testing time are determined on the basis of the equivalent wear of seals of the unit. A subsequent aging of the unit takes place under non-conditions for a time which is determined on the basis of the equivalent aging of seals of the unit being tested. This method is somewhat complicated and does not apply to swivel joints.

The operating life cycle of a swivel joint can be determined by actually observing the operation of the swivel joint over the course of its useful life. That approach, however, may not be the most practical method for the user and the manufacturer.

A simple and effective life cycle testing of swivel joints under conditions comparable to real working conditions is desired in industry and, especially, for swivel joints employed in a "pantograph" equipment for fueling/defueling of aircrafts, jets and helicopters in the aviation industry.

A method of establishing the operating life, such as a test setup and a procedure for determining the anticipated operating life of the swivel joint in the field, without actually requiring the swivel joint to be used in the field for several years, would, be very useful. The primary purpose of this test setup and procedure would be to know in advance the appropriate material of construction with the proper sealing material for a swivel joint with a specified operating life for a particular application.

BRIEF SUMMARY OF THE INVENTION

It is, therefore, an object of the present invention to provide a method for life cycle testing of-swivel joints under working conditions.

It is another object of the present invention to provide a testing equipment (test setup) and to establish a procedure for determining an operational life cycle for swivel joints having conduit parts (elements) relatively rotating by means of balls and/or roller bearings, and further having seals preventing penetration of a fluid and outside dirt into the bearing races.

Based on the information received from users in the field and working knowledge obtained from field engineers for more than 30 years, various data has been obtained as to the "average" number of swivel joint rotations/cycles/operations per day, working loads on the swivel joints under various conditions, operating environments, etc., that have allowed parameters to be established for testing and establishing the operating life of swivel joints in a controlled test area (other than field). A procedure has been established, using a special test apparatus (test setup), to predict the operating life of swivel joints.

With the results obtained in the test, the customer will be able to maximize the use of particular type of swivel joint, and a manufacturer will be able to manufacture the optimum swivel joint for a particular application. This information can also be used to establish a product warranty or guarantee period.

The present invention finds particular utility for the life cycle testing of "pantograph" swivel joints for the aviation industry. However, it may also find utility as a fluid-test for life cycle testing of any joints having a pair (or more) of co-axial relatively rotating parts with sealing therebetween.

According to the teachings of the present invention, fluid under a certain pressure is supplied to the swivel joint, and a predetermined mechanical load is applied thereto to load the bearings within the swivel joint. While maintaining either one of the conduit elements immovable, another one of the conduit elements is continuously rotated by a predetermined number of rotational cycles, with the direction of rotation being intermittently (periodically) reversed after a predetermined time period.

The pressure of the fluid supplied to the swivel joint is monitored by a pressure gauge, such that any leakage occurred is determined once the pressure drops. If the pressure does not fall within certain limits, the power is cut-off such that the test is stopped. Optionally, the leakage occurred may be observed visually.

First and second load arms are provided, and the first load arm is attached to the rotated conduit element. The first and second load arms are joined by an auxiliary swivel joint. Preferably, a hydraulic jack supports the second load arm and applies the predetermined mechanical load to the swivel joint under the test. The first load arm is rotated, thereby driving the companion conduit element of the swivel joint under test.

Preferably, the means for rotation of the first load arm includes a reversible motor, a gear on the first load arm, and a speed reducing means between the reversible motor and the gear on the first load arm.

Preferably, the direction of rotation is reversed automatically, and is facilitated by a controller unit having a timer (or counter) and a switch controlled by the timer (or counter) for automatic reversing of the direction of rotation after a certain period of time or once a certain number of rotational cycles has been accomplished.

In accordance with the further teachings of the present invention, a test setup is disclosed which includes a rigid test bench having a horizontal platform, a pipe support at the first end, and a hydraulic jack at the second end of the platform. A fluid supplying pipe is horizontally supported by the pipe support. The first and second load arms (connected by the auxiliary swivel joint) are supported horizontally and co-axially with the fluid supplying pipe. The fluid supplying pipe and the second load arm are maintained immovable, while the first load arm is capable of reversible rotation. Preferably, a reversible motor, which has a reversing switch, drives the first load arm to reversibly rotate, thereby driving the respective conduit element of the swivel joint. The rotation of the motor is conveyed to the gear on the first load arm through a reduction gear, speed reduction worm gear box and a chain drive, in sequence, such that the conduit element of the swivel joint under the test is rotated at a desired speed of rotation which can be adjusted.

Preferably, the swivel joint under test includes male and female conduit elements, a main seal, and a removable plug within the female conduit element maintaining the main seal in proper position for bridging the clearance between the female and male conduit elements. The plug is easily removed once the main seal is to be replaced, and the plug is installed back in place once the main seal has been replaced without dismantling the bearings.

These and other objects of the present invention will become apparent from a reading of the following specification taken in conjunction with the enclosed drawings.

DESCRIPTION OF THE PREFERRED EMBODIMENTS

The purpose of the life cycle test of the present invention is to provide a quantitative and qualitative validation of the warranty for swivel joints, which for most of the applications is not less than 10 years of satisfactory use of the swivel joints for interconnecting pipe sections (or load arms) of articulated fluid, transfer equipment, for instance, of the "pantograph" assembly for refueling helicopters, aircrafts, and the like.

With reference to FIGS. 1–4, a swivel joint 10 under the test is a built-in flanged end type pipe swivel joint as disclosed in application Ser. No. 08/620,990, filed by the present invention on Mar. 22, 1996. It will be appreciated, however, that the swivel joint 10 is only an example and that other swivel joints may be tested by the disclosed apparatus consonant with the teachings of the present invention.

Figure 4:
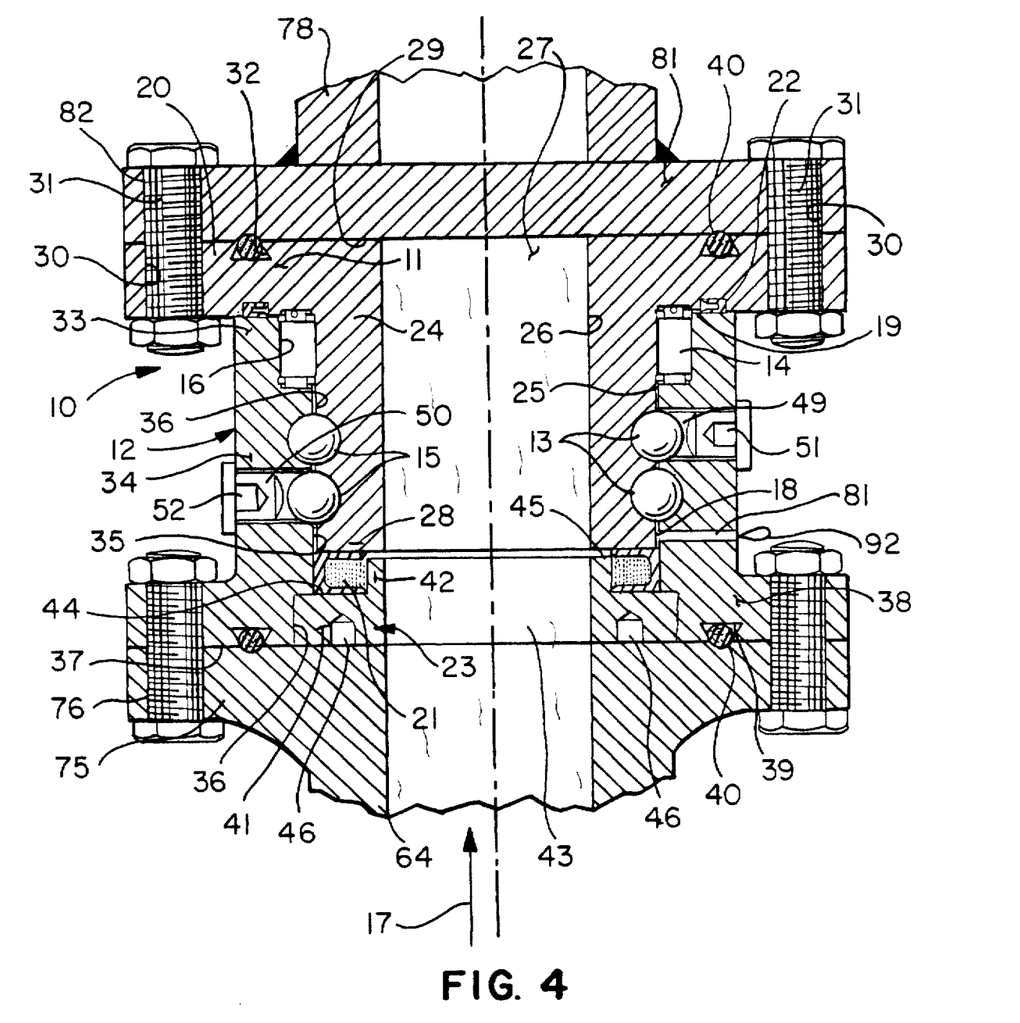
FIG. 4 is a longitudinal cross-section of the swivel joint and connected pipes (partially) taken along lines 4—4 of FIG. 2 and drawn to an enlarged scale.

With this in mind, and as best shown in FIG. 4, the swivel joint 10 comprises a male conduit element 11 and a female conduit element 12 rotatably secured together by annular ball bearings 13 and an annular roller bearing 14. The ball and roller bearings 13, 14 also prevent the female and male conduit elements 11, 12 from axial movement with respect to each other.

Since the ball and roller bearings 13, 14 are so important for proper functioning of the swivel joint 10, they are to be protected from inside and outside contamination. The contamination of the ball bearing race chambers 15 and roller bearing race chamber 16 usually takes place by a fluid 17 transported through the swivel joint 10 via a clearance 18 existing between the male and female conduit element 11, 12, and/or by outside materials via a clearance 19 between the female conduit element 12 and a flange 20 of the male conduit element 11 (to be discussed further in a succeeding paragraph). In order to protect the bearings 13, 14 from inside and outside contamination, the swivel joint 10 is provided with a main seal 21 sealing the clearance 18 and a second seal 22 (dirt seal) bridging the clearance 19.

A removable plug 23 is secured to the female conduit element 12 in order to maintain the main seal 21 in proper functioning position for bridging the clearance 18. Once the main seal 21 is to be replaced, the plug 23 can be easily removed and installed back in place as the main seal 21 has been replaced with a new one.

The male conduit element 11 includes a generally cylindrical inner member 24 having an outer surface 25 and an inner surface 26 defining a passage 27 extending axially the length of the male conduit element 11. The inner member 24 has a proximal end 28 and a distal end 29. The distal end 29 is a built-in flanged end provided with the annular flange 20 for being connected to a respective pipe section. Holes 30 are provided on the flange 20 for allowing a securing means 31 through. Preferably, each flange 20 is provided with eight ⅝" UNC tap holes circumferentially spaced apart along the flange 20 equally distanced from each other.

The flange 20 has an annular groove 32 for retaining the dirt seal 22 bridging the clearance 19 between the flange 20 and the end 33 of the female conduit element 12.

The female conduit element 12 includes a generally cylindrical outer member 34 having a first internal bore 35 and a second internal bore 36. Both internal bores 35, 36 extend axially through the outer member 34 such that the sum of the lengths of the internal bores 35 and 36, respectively, constitutes the length of the outer member 34. The internal bore 36 is wider than the internal bore 35. The outer member 34 has the end 33 (discussed above) and the opposite built-in flanged end 37 which has an annular flange 38 serving for connection to a respective pipe section (or load arm). Similar to the flange 20, the flange 38 also has eight holes facilitating the above-described connection. Both flanges, 20 and 38, are provided with annular grooves 39 for retaining a respective "O" ring seal 40 which fits into the respective groove 39 for sealing the flanges 20, 38 of the male or female conduit elements 11, 12 with companion flanges of the respective pipe sections. The "O" ring seal 40 prevents any flange joint leakage and requires much less forces to be applied in order to tighten the flange joints. By employing the "O" ring seal 40, the installation of gaskets between companion flanges for maintaining pressure tight flange joints can be avoided.

The plug 23 includes a generally cylindrical body 41 and an annular elevated portion 42 integral therewith. The plug 23 is made of either carbon steel, stainless steel or an alloyed material. A passage 43 extends axially through the plug 23. When the plug 23 is installed, and the inner member 24 of the male conduit element 11 is received within the internal bore 35 of the female conduit element 12, the passage 27 in communication with the passage 43 define a continuous passage for the fluid 17 transported through the pipe swivel joint 10.

The main seal 21 is supported by the plug 23 between the upper surface 44 of the cylindrical body 41 and the proximal end 28 of the inner member 24 of the male conduit element 11, and between the outer surface 45 of the elevated portion 42 and a portion of the internal bore 35 of the female conduit element 12.

The main seal 21 is a lip-type elastomeric seal having an annular body surrounding the elevated portion 42 of the plug 23 with an inward lip portion facing the outer surface 45 of the elevated portion 42 and an outer lip portion facing the portion of the internal bore 35 of the female conduit element 12.

In combination with the dirt seal 22 (which is preferably, a lip-type seal or "V" seal), the main seal 21 provides a reliable sealing of the clearance 18.

When the plug 23 (which threadingly engages the female conduit element 12) is to be removed for the main seal 21 replacement, the plug 23 is rotated by means of a special spanner (not shown) inserted into the holes 46 on the bottom of the plug 23. After the main seal has been replaced, the plug 23 is very easily installed into the swivel joint and (because of its configuration) cannot be installed incorrectly.

The ball bearings 13 are introduced into their race chambers 15 through threaded access passages 49, 50 which are closed by threaded plugs 51, 52 built-in with grease nipples.

As it will be appreciated by those skilled in the art, the main elastomeric seal 21 is a combination seal (PTFE outer seal with Viton Insert, Buna-N Insert or other elastomeric materials) and provides extra sealing strength for the swivel joint 10.

The design and construction of the swivel joint 10 forms no part of the present invention, having been disclosed and claimed on the applicant's aforementioned co-pending application Ser. No. 08/620,990 filed Mar. 22, 1996 and entitled "A PIPE SWIVEL JOINT WITH REMOVABLE PLUG FOR MAIN SEAL REPLACEMENT".

Although discussed in association particularly with the above-mentioned swivel joint 10, the life cycle test setup 53 of the present invention is perfectly applicable to hydraulic (and any fluid) testing of any swivel joint having co-axially rotating conduit elements and sealed to prevent leakage through a clearance existing between the conduit elements.

It is highly desirable in the industry that users of the swivel joints would require (and manufacturers of swivel joints would have to guarantee) a certain life cycle of satisfactory operation, without leakage, for the swivel joints.

Since it is not practical to run the test for leakage over the course of useful life of a swivel joint (which, for instance, may exceed 10 years), the simulation is made based on normal average operational regimes: four rotational cycles (operations) a day, 250 working days a year, 10 years. This means that during the life cycle testing, the swivel joint must make 10,000 rotational cycles (operations) which will correspond to 10 years of normal performance in articulated fluid transfer equipment. It will be appreciated by those skilled in the art, that the test can be run also a different number of rotational cycles (higher or lower) according to required life cycles in the industry, in order to meet respective life cycles requirements of different users, different swivel joints, different equipment, and, different operational conditions.

The 10,000 operations duration test is disclosed herein for the purposes of example, and in no way limits the present invention to this number.

If a leakage occurs during the test, the swivel joint 10 under the test did not meet the life-cycle requirement, and the swivel joint will be studied for the reasons which caused the problem, so that any design deficiencies may be removed for improvement of the swivel joint. If the leakage did not occur during the test, the swivel joint is considered capable of satisfactory working for the period not shorter than the required life cycle, and the manufacturer can give a required guarantee. It will be appreciated by those skilled in the art, that the swivel joint under the test cannot be used for normal operations after the test. However, other swivel joints identical to the swivel joint under the test, i.e. of the same design, the same materials, same suppliers of parts, etc., will be capable of normal satisfactory operations for the guaranteed life cycle.

With reference again to FIGS. 1–4, an apparatus for life cycle testing, further also referred to as a test setup 53, includes a rigid test bench 54 with a horizontal platform 55. A pipe support 56 is vertically secured to the platform 55 at the end 57 thereof, while a hydraulic jack 58 is vertically secured at an opposite end 59 of the platform 55. The platform 55 has a raised portion 60 which extends from a side 61 of the platform 55 for supporting a motor 62 and a speed reduction worm gear box 63 (to be discussed below).

Figure 1:
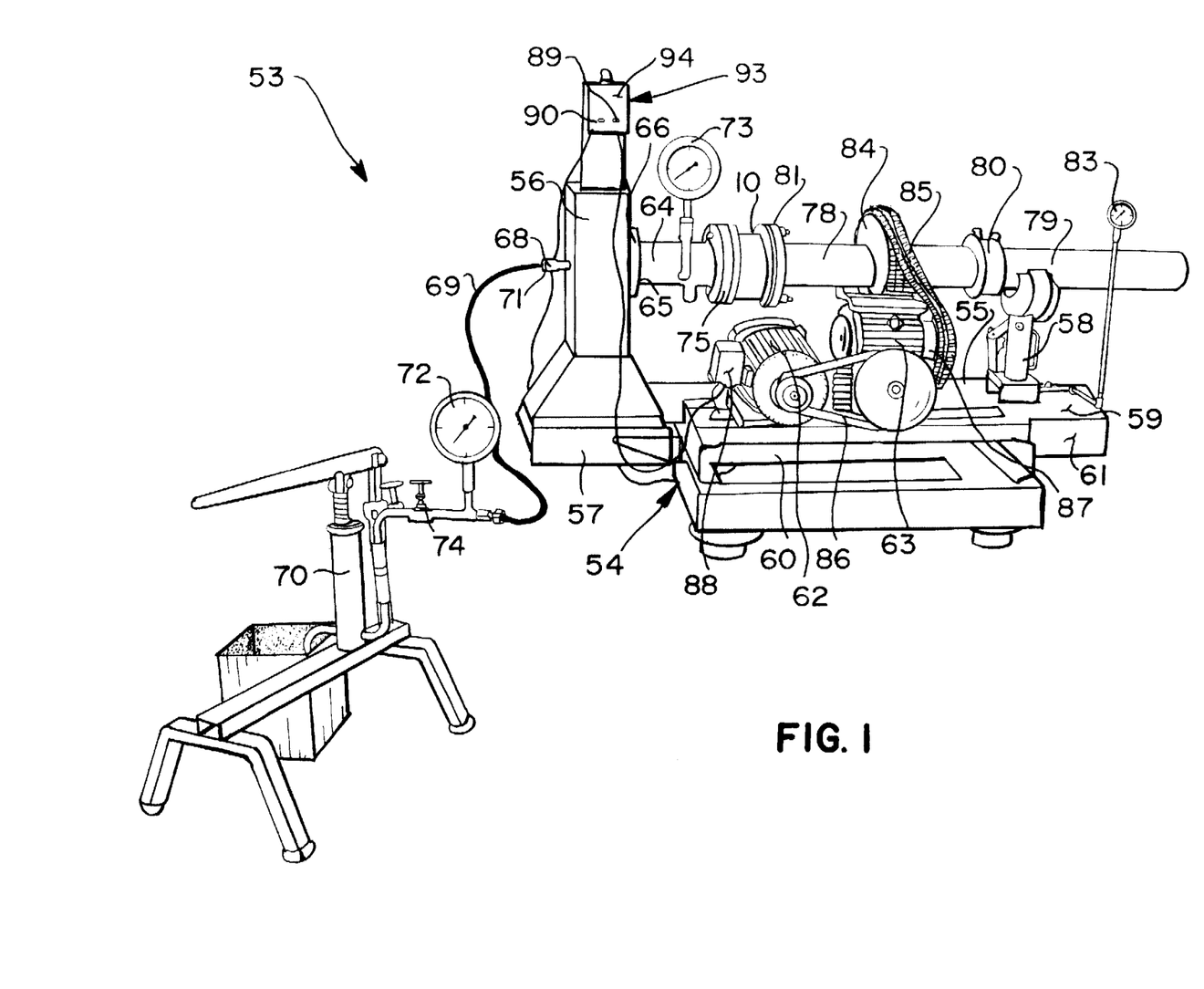
FIG. 1 is a pictorial view of a life cycle test setup of the present invention.
Figure 2:
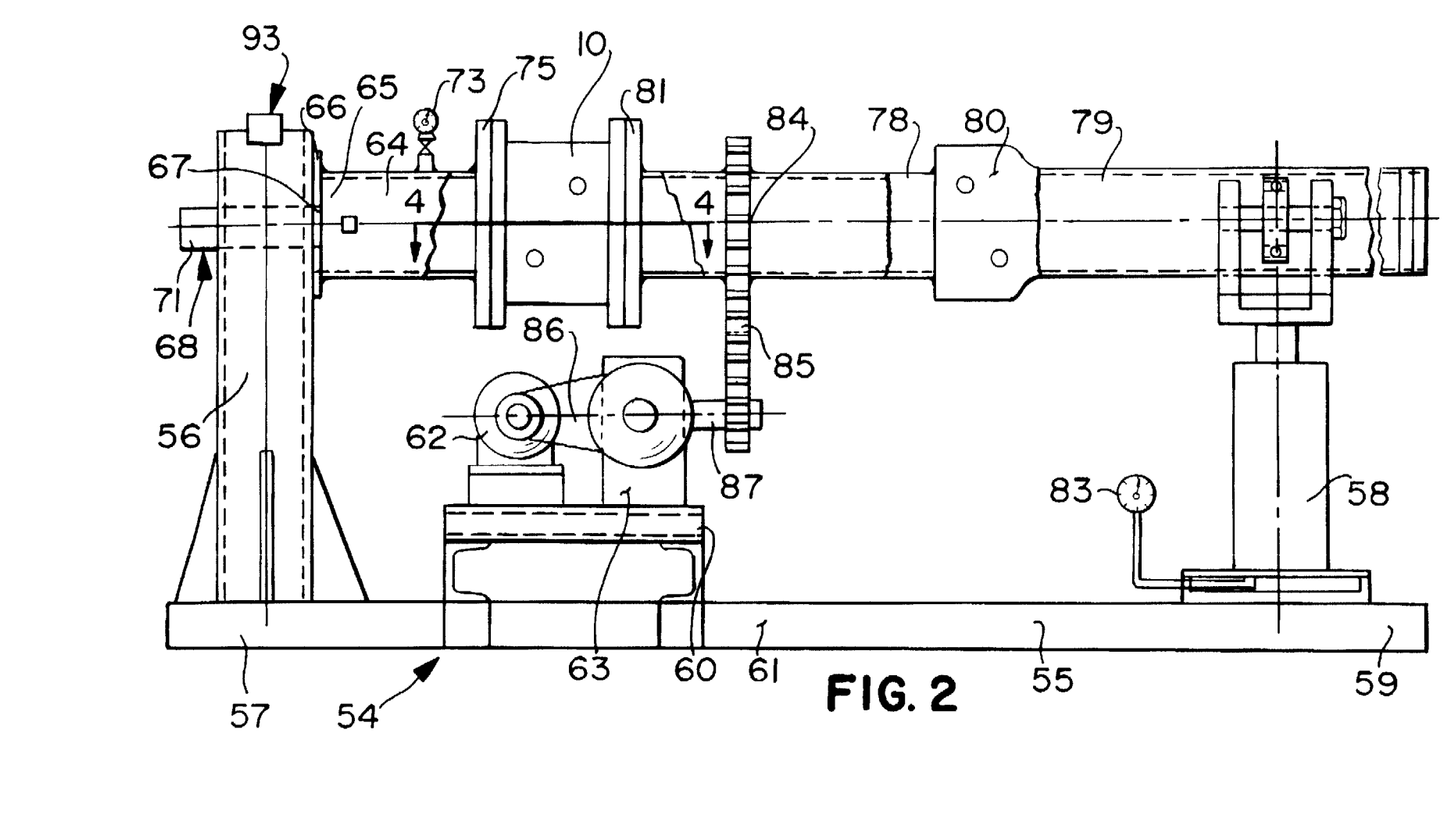
FIG. 2 shows (somewhat schematically) a side elevation of the test setup of the present invention.
Figure 3:
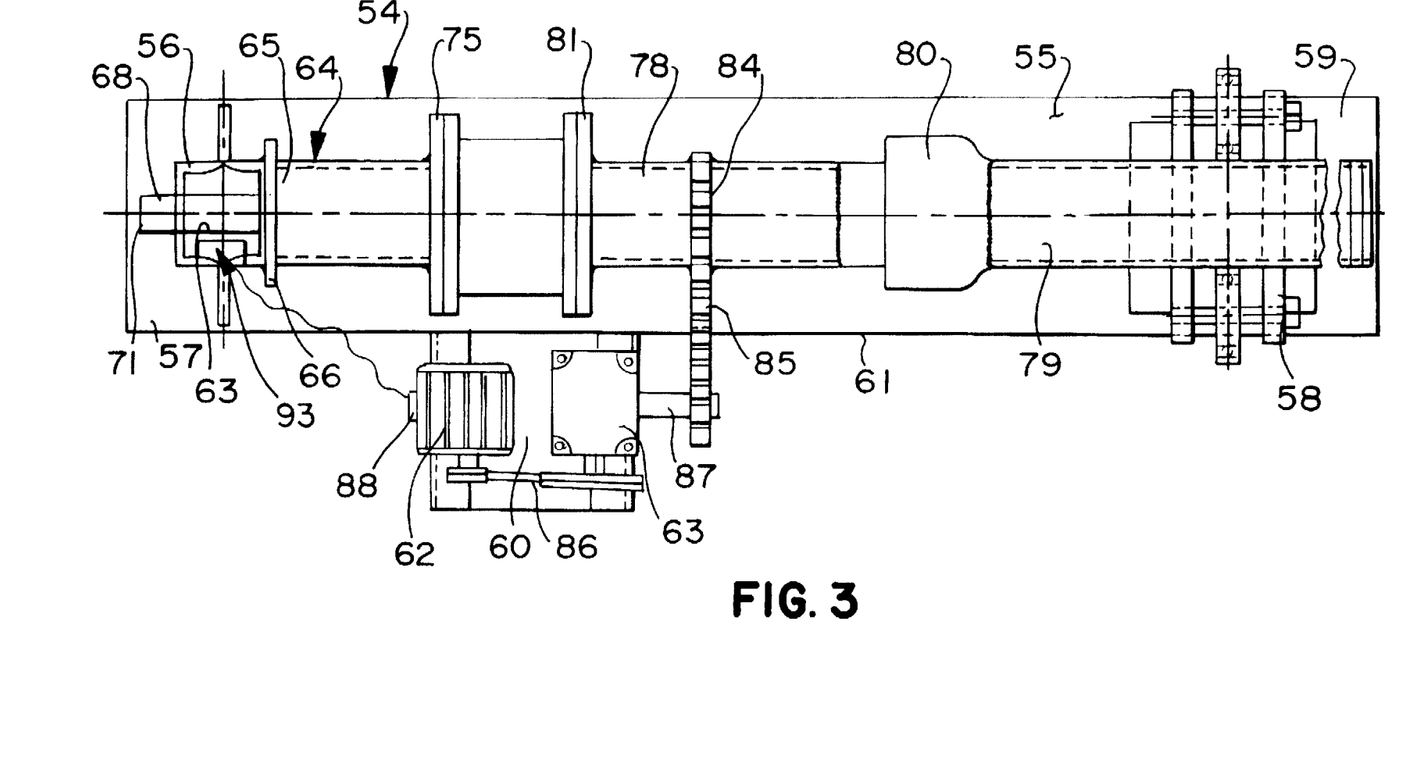
FIG. 3 shows (somewhat schematically) a plan view of the test setup of the present invention.

A fluid supplying pipe 64 is horizontally secured at an end 65 thereof to the pipe support 56. For this purpose, the fluid supplying pipe 64 at the end 65 is provided with a flange 66 which is fixed to the pipe support 56 by a weld or other suitable means known to those skilled in the art.

The pipe support, as best shown in FIGS. 2 and 3, has a through opening 67 of a diameter smaller than the diameter of the fluid supplying pipe 64. A rigid pipe 68, connected to the fluid supplying pipe 64, protrudes through the through opening 67. The rigid pipe 68 provides an additional mechanical support for the fluid supplying pipe 64 and serves for connection to a hose 69 supplying the fluid 17 from a pump 70. The end 71 of the pipe 68 is threaded (not shown) to facilitate the connection to the hose 69. This connection is known to those skilled in the art, and is not intended to be discussed herein in detail.

The pressure of the fluid 17 is continuously indicated by two pressure gauges 72 and 73. The gauge 72 indicates the pressure of the fluid 17 entering the hose 69, while the gauge 73 indicates the pressure of the fluid in the fluid supplying pipe 64. In the beginning of the fluid supply, the gauge 72 shows a higher pressure than the gauge 73. However, once a dynamic balance has been achieved, the gauges 72, 73 show equal pressure. When the required pressure is achieved, a valve 74 is shut down. The fluid supplying pipe 64 is provided with a flange 75 opposite to the flange 66. The flange 75 is secured to the flange 20 of the male conduit element 11 or to the flange 38 of the female conduit element 12 of the swivel joint 10. Similar to the flanges 20 and 38 of the swivel joint 10, the flange 75 is provided with eight holes 76 (preferably, ⅝" UNC tap holes) circumferentially spaced apart along the flange 75 and equally distanced from each other. The securing bolts 31 protrude through the aligned respective holes 30 and 76 and are tightened by means known to those skilled in the art to facilitate securing the fluid supplying pipe 64 to the swivel joint 10 under the test.

Two load arms 78 and 79 connected by an auxiliary swivel joint 80 are supported horizontally and co-axially with the fluid supplying pipe 64 and the swivel joint 10 under the test.

The load arm 78 has a flange 81 which is connected to the flange 20 or 38 (which is not connected to the flange 75 on the fluid supplying pipe 64) of the swivel joint 10. Similar to the flange 75, the flange 81 has eight holes 82, which when aligned with the holes on the companion flange (20 or 38) of the swivel joint 10, allow the securing bolt 31 therethrough for securing purposes.

In contrast to the companion flange (20 or 38) of the swivel joint 10 and to the flanges 75 and 66 on the fluid supplying pipe 64, the flange 81 is a blind flange. As best shown in FIG. 4, where the blind flange 81 is shown attached and secured to the flange 20 of the male conduit element 11 (similarly, the blind flange 81 can be secured to the flange 38 of the female conduit element 12) the blind flange 81 stops the fluid 17 in the swivel joint 10 and does not allow the fluid 17 into the load arm 78. As discussed above, the swivel joint 10 can be tested in both positions: either the male conduit element is fixed and the female conduit element rotates, or the female conduit element is fixed and the male conduit element rotates. However, for the most of the swivel joints applications, the male conduit element is a rotating part; therefore, for testing purposes, it is preferable to secure the male conduit element to the blind flange 81 (as best shown in FIG. 4).

The load arm 79 is supported and held immovable by the hydraulic jack 58 horizontally and co-axially with the load arm 78. By means of the hydraulic jack 58, a mechanical load is simulated which would be typically found in the industry (for example, 3 tons) and is applied to the swivel joint 10 under the test such that to load the bearings 13, 14.

Figure 7:
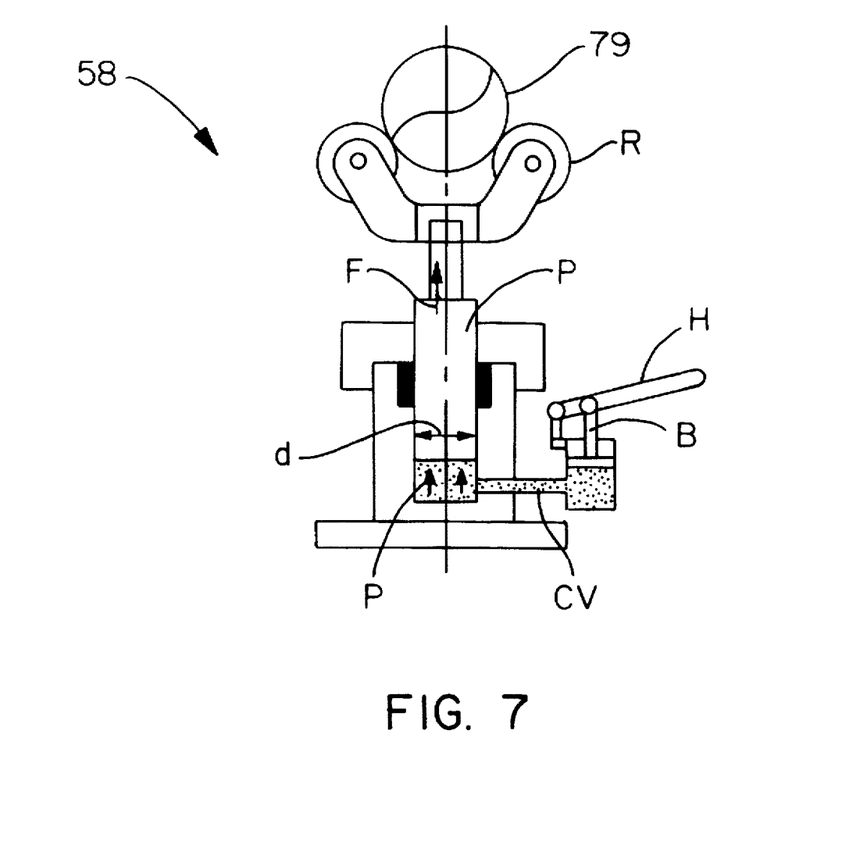
FIG. 7 shows (somewhat schematically) a hydraulic jack employed in the test setup of the present invention.

The hydraulic jack 58 is shown in FIG. 7, wherein a jack piston is identified as P, a roller is identified as R, a handle is identified as H, a plunger of the pump is identified as B, and a check valve is identified as CV; moreover, d is a diameter of the Jack Piston in inches, and p denotes hydraulic pressure in psi.

The mechanical force F through the hydraulic jack 58 to be applied to the swivel joint, is calculated as follows:

The area of piston=$\pi=\pi/4$ $d^2=0.7854$ $d^2$

The force F=area×intensity of pressure.

F=0.7854 $d^2 \times p$

The bending moment BM (for a 4" pipe made of A 106 Gr. B.)=31716 lb.×in.

It will be readily understood by those skilled in the art that the value of the bending moment (BM) is a standardized value for particular material and a particular size of the pipe, according to American Society of Testing Materials ("ASTM") standards.

If the force F is acting at 30" from the central line of the swivel joint 10, then the force F=31716/30=1057.20 lbs.

For the 3 tons jack, d=1.18" (30 mm).
The area a=0.7854×1.18×1.18=1.093 sq. in.
Hence p=1057.20/a=1057.20/1.093=967 psi.

This is the pressure of oil in the hydraulic jack 58 cylinder to be maintained in order to provide the required force to be applied to the swivel joint 10.

It will be appreciated by those skilled in the art, that using the similar pattern of calculations, the force F and the pressure P can be calculated for different sizes of load arms and different types of hydraulic jacks. (For different sizes and types of materials of the load arms, the value of BM is to be determined from ASTM standards).

The load conditions are constantly indicated by a pressure gauge 83. As it will be readily understood by those skilled in the art from the above discussion, the load arm 78 is capable of rotation, while the fluid supplying pipe 64 and the load arm 79 are maintained immovable.

For being rotated, the load arm 78 is provided with a gear 84 which is driven from the gear box 63 (discussed above) by means of a chain drive 85. In a preferred embodiment, the motor 62 is a 1 HP motor rotating at 1450 rpm. The rotation rate of the motor 62 is reduced by 3:1 (to 500 rpm) through "V" belt 86, and further, through the speed reduction worm gear box 63, a 10 rpm rotational rate is provided to a driving pinion 87 of the chain drive 85. The chain drive 85 has a ¾ pitch simplex/duplex chain which drives the gear 84 on the load arm 78 (which is a driven gear) and provides a 10:4 speed reduction, resulting in rotation of the load arm 78 at 4 rpm when the motor 62 is energized. It is understood by those skilled in the art, that the rotation of the load arm 78 causes the rotation of the respective male or female conduit element, 11 or 12, attached to the load arm 78 with the same rotational speed and in the same direction as the load arm 78.

The motor 62 is a reversible type motor and is provided with a switch 88 changing a direction of rotation or switching the motor off.

Each 360 angular degrees of the respective male or female conduit element (11 or 12) rotation in either direction is considered a rotational cycle of the swivel joint 10. The number of the rotational cycles passed by the respective conduit element (11 or 12) in each direction is counted by a counter (or rotation cycle indicator) 89.

Optionally, a timer 90 is provided for timing the time of rotation of the motor 62 in each direction. The timer 90 is electrically connected to the switch 88 in order to automatically reverse a direction of the rotation of the motor 62 after a certain predetermined period of time.

It will be readily understood by those skilled in the art, that since the speed of rotation is maintained constant during the test, this predetermined period of time always corresponds to a certain number of rotational cycles; and accordingly, if desired, the counter 89 and the timer 90 can be interchangeable units in the test setup of the present invention.

Optionally, the motor 62 can be switched "OFF" once the swivel joint 10 passed the overall number of the rotational cycles corresponding to the required life cycle (indicated by the counter 89) or after the timer 90 indicated an overall predetermined duration of the test.

Since the speed of the rotation is known (4 rpm) and, during the test, is maintained the same each given instant, the swivel joint 10 will pass the overall number of the rotational cycles (10,000) corresponding to the required life cycle (10 years) for a certain period of time (10,000 rotations/4 rpm=2,500 min=41.7 hr.). Therefore, either a number of rotational cycles or a time required for this number of the rotational cycles can be considered a controlling parameter for switching "OFF" or reversing the switch 88.

The life cycle testing, according to the present invention, is performed according to the following schedule:

The fluid 17 is supplied to the swivel joint 10 through the hose 69, pipe 68 and the fluid supplying pipe 64, in sequence, by means of the manual pump 70 until the pressure of the fluid 17 reaches a certain value and then the valve 74 is closed. The pressure is permanently indicated by the pressure gauges 72 and 73.

A predetermined mechanical load is applied to the swivel joint 10 through the load arms 78 and 79 by means of the hydraulic jack 58. The magnitude of the mechanical load is permanently indicated by the pressure gauge 83.

The timer 90 is preset for a certain time period of rotation of the motor 62 in each direction.

The motor is energized for continuous rotation in both directions periodically reversing the direction of rotation after each period of time preset on the timer 90.

The counter 89 indicates number of rotational cycles which the swivel joint 10 passes. The overall number of the rotational cycles (in both directions) corresponds to the required life cycle.

The swivel joint 10 is observed visually on subject of the leakage. Bubbles of the fluid on the surface swivel joint 10 are evidence of the leakage. For more spectacular results, as best shown in FIG. 4, a capillary 91 is made through the wall of the outer member 34 of the female conduit element 12 slightly above the main seal 21. If the main seal 21 fails, the fluid 17 under the pressure penetrates through the clearance 18 and further penetrates through the capillary 21. An observer will easily see the bubbles 92 of the fluid 17 on a surface of the swivel joint 10 once the leakage occurred.

The pressure gauges 72 and 73 are monitored. (Pressure drop may be the evidence of the leakage.)

If the leakage occurs during the test run, the motor 62 is switched off, and a serious investigation/study is made of what evoked the leakage and what measures should be undertaken to remove all reasons causing the beforetime failure of the swivel joint.

The life cycle test discussed below was performed according to the teachings of the present invention. The data of the test are shown as the example, and in no way intend to limit the present invention.

PRODUCT UNDER TEST
Product: Pantograph SS Swivel Joint 10
Size: 4" (100 mm)
Body Material: Stainless Steel 304
Seals Material: Main Seals 21 of PTFE with Viton Insert and Secondary seal 22 of Viton
Bearings: Two Ball Bearings 13 and one roller bearing 14
Special feature: The Main PTFE Seal 21 can be replaced by removing the removable plug 23 at the bottom 21 of the swivel joint 10, without dismantling any bearings.
Lubrication: Lubricated for life with NO periodical lubrication required.

TEST EQUIPMENTS, UTILIZED DURING THE TEST
Driver Motor 62: Jyoti Ltd. Baroda
Manufacturer & Model No. MEXL 16111 1HP. Type: TEFC
Accuracy: 3 Phase, 1400 RPM, volt 415; amp 212
Hand Pump:
Manufacturer: Associate Engineers
Model No. R100
Capacity: 0–1,500 psi
Hydraulic Jack 58:
Manufacturer: Vankos & Company, Patna, India
Model No. SS-3/150; 3 ton×6"; LIFT Gauge 72, 73
Manufacture & Model No.: Pre-con. 6": DIAL, Sr. No. 3494,
Timer 90 Range: 0–30 minute
Manufacturer: L & T
Load Weight: Pr. Gauge
Manufacture: UDAY
Model No. Sr. 3078 0–100 kg/cm²g
Accuracy: 4" Dia.; 0–1500 psi
Voltmeter: ANALOG
Accuracy: ±2%
Ammeter:
Accuracy: ±2%
Reduction Gear Ratio: 50:1
Manufacturer: Elecon Engg, India
Sr. No. 228897
Model: 3 NU F 12 F

PRE-TEST PROCEDURE:

Prior to beginning the test, the Pantograph Swivel Joint 10 should be carefully checked visually that both ball retainer plugs 51, 52 on the swivel joint 10 are in proper place.

For the test setup 53, perform a comprehensive visual check of the test setup and ensure that all equipment is secured in place. Ensure that the Pantograph swivel joint 10 is properly mounted in the test rig 53.

Perform a comprehensive safety check of the test setup 53, checking in particular, all explosion proof, electrical connections and wiring, the pressurized fitting and connection, and all mechanical valves and coupling (i.e. the reduction gears 63, 86 and chain drive 85).

Check visually that the pressure on the fluid pressure gauge (72, 73) indicates that the swivel joint 10 is not pressurized. The test setup is now ready for testing.

The location, date, time, and temperature should be recorded prior to starting the test.

Prior to beginning the test, an independent certified test engineer should confirm a Pantograph Swivel Joint; the Test Setup, and the Test Procedure according to the documentation.

TEST PROCEDURE:

CAUTION:

Discontinue pressurizing if the swivel joint or test setup pipe show any signs of leakage when the pressure is being increased.

1. Using the hand pump 70, carefully pressurize the swivel joint 10 and the fluid supplying pipe 64 to a pressure of 275 PSI.

CAUTION:

Discontinue the application of force to the simulated "load arm" 79 if the hydraulic jack 58 does not appear to be operating properly.

2. Preload the swivel joint bearing using the calibrated hydraulic jack 58 to a moment of 31,716 inch/lbs, (moment arm is 30 inch, load is 1.057.2 lbs.).

3. Set the reversing switch 88 on the motor 62 to change the direction of rotation every five minutes complete rotations of the fluid supplying pipe 64.

CAUTION:

Remove power from the motor 62 immediately if the motor 62 or the drive mechanism does not appear to be operating properly.

4. Apply power to the 1 HP drive motor 62 and record the voltage and current.

5. Rotate the fluid supplying pipe 64 at 4 RPM for twenty complete rotations (for five minutes).

6. Reverse the direction of rotation.

7. Repeat this process continuously for 10,000 cycles (5 minute/rotation=20 cycles=day constant testing). NO LEAKAGE IS ALLOWED DURING THE TEST.

It may be desirable to repeat the same basic test with different operating pressures and various load moments to establish more test data and life cycle information.

TEST DATA, TEST DATA FORM AND OBSERVATIONS

Information required to be recorded prior to, and during, the testing of the Panograph Swivel Joint includes:

1. Fuel Pressure (PSI)
2. Moment (Hydraulic jack load×moment arm)
3. Place, Date, time and ambient temperature.
4. Motor voltage and current (to calculate torque required)
5. Number of turns clockwise (CW)
6. Number of turns counter-clockwise (CCW)
7. Rotational speed (RPMs)

Throughout the test, the swivel joint will be constantly observed for any indication of leaking.

TEST RESULTS

The Pantograph Swivel Joint has passed the test without any leakage for 10,000 (ten thousand) cycles. Based on this, the continuous use life of the swivel joint is established to be 10 years or more.

Figure 5:
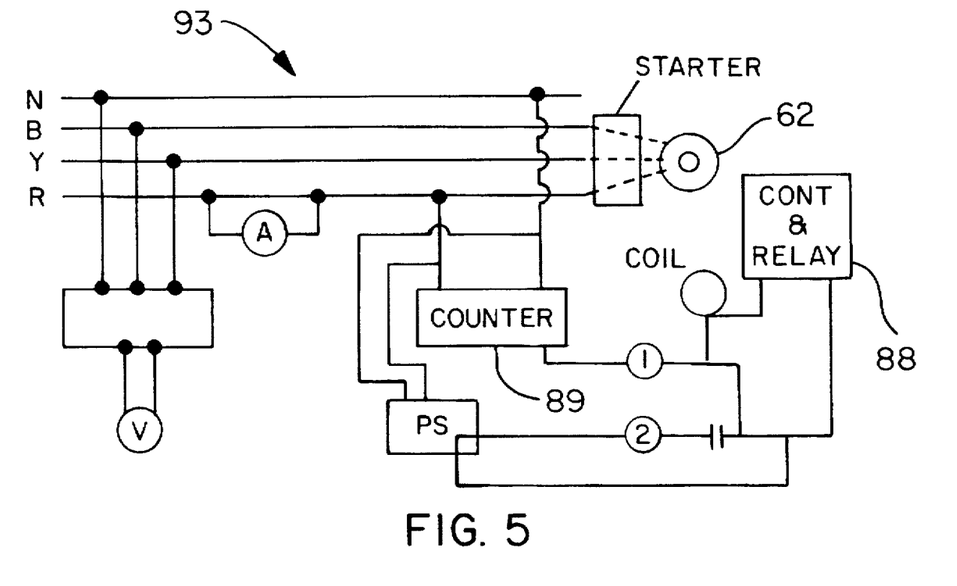
FIG. 5 shows (somewhat schematically) an electrical diagram of the control unit of the present invention.

In the preferred embodiment of the present invention, a control unit 93 will control the test setup during the test as best shown in FIG. 5. Preferably, the control unit 93 may include a programmable logic controller (PLC), and may have a control panel 94 (discussed below and best shown in FIG. 6). Thermal protection is provided by means of a bi-metallic relay.

The control unit 93 provides the following control functions:

Change direction of drive motor rotation after a fixed number of rotations or specific period of time (the time and number of rotations are adjustable);

Initiate system start/stop operations;

and the following monitor functions:

Monitor voltage and current consumed by the motor and provide indication (light/bell/alarm flag), if specific limits are exceeded.

Monitor pressure of fluid in the swivel joint and terminate operation if pressure is not within specified limits (limits are adjustable).

The control unit 93 also provides data to be displayed on the control panel 94 such as:

Number of operations (cycles) since the start of the test.
Number of operations remaining to complete the test.
Accumulated time since the start of the test.
Time remaining to complete the test.

Figure 6:
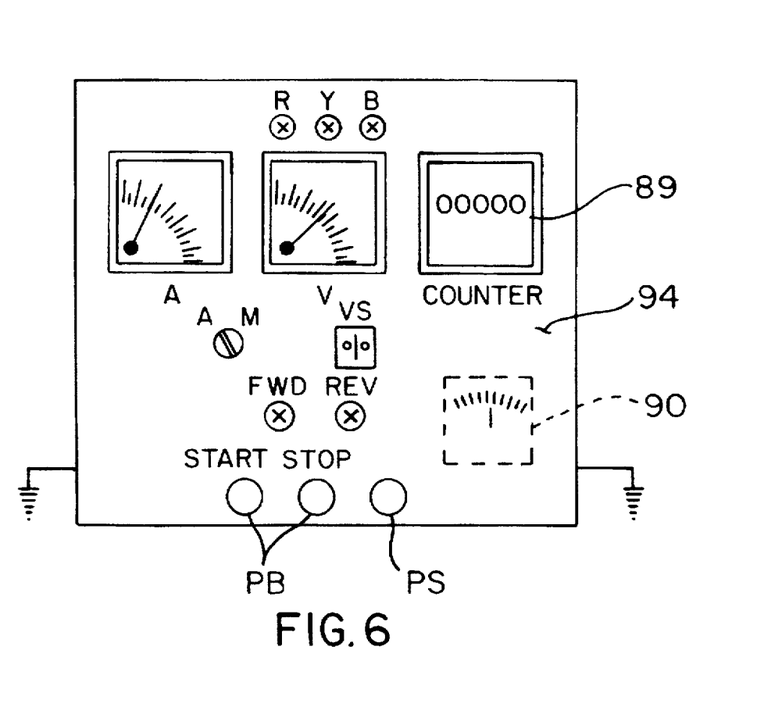
FIG. 6 shows the control panel of the present invention.

As best shown in FIG. 6, the control panel 94 houses a voltmeter V (0–500 V); an ampmeter A (0–10 amp); optionally, the timer 90 (0–30 min.); the digital counter 89 (5 digits, 0–99999); a pressure switch PS; a pair of push buttons PB for test cycle start and finish; a voltmeter selector switch VS; a selector switch A/M (AUTO/MANUAL); forward push button FWD; reverse push button REV; and pilot lamps: blue (B), yellow (Y) and red (R) indicating that the motor rotates in forward, or reverse direction, or that the power is OFF due to certain conditions (for example, leakage).

Again, as shown in FIGS. 5 and 6, the counter 89, counts the number of rotational cycles of the swivel joint. The pressure switch PS cuts off the power supply as soon as the pressure in the swivel joint drops to unacceptable lower limits for instance from 275 psi to 265 psi, that indicates that the leakage occurred. Number of cycles performed before the failure is displayed on the counter 89. It is also possible to set a certain number of cycles for the test and to check whether the failure occurred prior to the test has been accomplished. The voltmeter V and ampermeter A measure voltage and current consumed by the motor 62 and indicate if the specific limits are exceeded. The voltage and current can be recorded at specific intervals (15 min., 30 min., and so on).

Obviously, many modifications may be made without departing from the basic spirit of the present invention. Accordingly, it will be appreciated by those skilled in the art that within the scope of the appended claims, the invention may be practiced other than has been specifically described herein.

I claim:

1. For testing a swivel joint comprising coaxially rotating male and female conduit elements, respectively, wherein a clearance exists therebetween which is sealed to prevent a leakage of a fluid therethrough, and wherein a leakage may occur following the useful life of the swivel joint, a method for life cycle testing of said swivel joint, comprising the steps of:

supplying the fluid under a certain pressure to the swivel joint and applying a predetermined mechanical load thereto;

maintaining either one of said male and female conduit elements immovable, while continuously rotating another one of said male and female conduit elements in a given direction and for a predetermined number of rotational cycles, and periodically reversing the direction of rotation after a predetermined time period during the life cycle testings;

wherein the direction of rotation is reversed after approximately five minutes.

2. For testing a swivel joint comprising coaxially rotating male and female conduit elements, respectively, wherein a clearance exists therebetween which is sealed to prevent a leakage of a fluid therethrough, and wherein a leakage may occur following the useful life of the swivel joint, a method for life cycle testing of said swivel joint, comprising the steps of:

supplying the fluid under a certain pressure to the swivel joint and applying a predetermined mechanical load thereto;

maintaining either one of said male and female conduit elements immovable, while continuously rotating another one of said male and female conduit elements in a given direction and for a predetermined number of rotational cycles, and periodically reversing the direction of rotation after a predetermined time period during the life cycle testings, wherein the direction of rotation is reversed after approximately ten minutes.

3. For testing a swivel joint comprising coaxially rotating male and female conduit elements, respectively, wherein a clearance exists therebetween which is sealed to prevent a leakage of a fluid therethrough, and wherein a leakage may occur following the useful life of the swivel joint, a method for life cycle testing of said swivel joint, comprising the steps of:

supplying the fluid under a certain pressure to the swivel joint and applying a predetermined mechanical load thereto;

maintaining either one of said male and female conduit elements immovable, while continuously rotating another one of said male and female conduit elements in a given direction and for a predetermined number of rotational cycles, and periodically reversing the direction of rotation after a predetermined time period during the life cycle testings, wherein said another one of the female and male conduit elements is rotated at approximately 4 rpm.

4. For testing a swivel joint comprising coaxially rotating male and female conduit elements, respectively, wherein a clearance exists therebetween which is sealed to prevent a leakage of a fluid therethrough, and wherein a leakage may occur following the useful life of the swivel joint, a method for life cycle testing of said swivel joint, comprising the steps of:

supplying the fluid under a certain pressure to the swivel joint and applying a predetermined mechanical load thereto;

maintaining either one of said male and female conduit elements immovable, while continuously rotating another one of said male and female conduit elements in a given direction and for a predetermined number of rotational cycles, and periodically reversing the direction of rotation after a predetermined time period during the life cycle testings, wherein the fluid is supplied to the swivel joint under a pressure of approximately 275 psi.

5. For testing a swivel joint comprising coaxially rotating male and female conduit elements, respectively, wherein a clearance exists therebetween which is sealed to prevent a leakage of a fluid therethrough, and wherein a leakage may occur following the useful life of the swivel joint, a method for life cycle testing of said swivel joint, comprising the steps of:

supplying the fluid under a certain pressure to the swivel joint and applying a predetermined mechanical load thereto;

maintaining either one of said male and female conduit elements immovable, while continuously rotating another one of said male and female conduit elements in a given direction and for a predetermined number of rotational cycles, and periodically reversing the direction of rotation after a predetermined time period during the life cycle testings, wherein the mechanical load applied to the swivel joint is approximately three tons.

6. For testing a swivel joint comprising coaxially rotating male and female conduit elements, respectively, wherein a clearance exists therebetween which is sealed to prevent a leakage of a fluid therethrough, and wherein a leakage may occur following the useful life of the swivel joint, a method for life cycle testing of said swivel joint, comprising the steps of:

supplying the fluid under a certain pressure to the swivel joint and applying a predetermined mechanical load thereto;

maintaining either one of said male and female conduit elements immovable, while continuously rotating another one of said male and female conduit elements in a given direction and for a predetermined number of rotational cycles, and periodically reversing the direction of rotation after a predetermined time period during the life cycle testings, further comprising the steps of:

providing an auxiliary swivel joint, providing first and second load arms, attaching one end of the first load arm to the swivel joint, joining another end of the first load arm and the second load arm through said auxiliary swivel joint, providing a hydraulic jack and a second pressure gauge, wherein the hydraulic jack supports the second load arm and applies said predetermined mechanical load to the swivel joint under the test through said first and second load arms, and wherein the second pressure gauge monitors said mechanical load.

7. The method of claim 6, further including the step of providing a means for rotating the first load arm, thereby driving said another one of the female and male conduit elements of the swivel joint under the test.

8. The method of claim 7, wherein said means for rotating the first load arm includes a reversible motor, a gear on the first load arm and a speed reducing means between the reversible motor and the gear on the first load arm, such that the speed of rotation of the first load arm is approximately 4 rpm.

9. The method of claim 8, wherein said reversible motor rotates at approximately 1450 rpm.

10. The method of claim 6, wherein said another one of the female and male conduit elements has a flange, wherein a blind flange is provided at said one end of the first load arm opposite to the auxiliary swivel joint, and wherein the flange on the swivel joint and the blind flange on the first load arm are attached to each other.

11. An apparatus for life cycle testing of a swivel joint having first and second relatively rotating conduit elements having a clearance therebetween which is sealed to prevent leakage through said clearance, the apparatus comprising:

a rigid test bench having a horizontal platform with first and second ends thereof, a pipe support at the first end and a jack at the second end of the platform, a fluid supplying pipe horizontally supported by the pipe support, an auxiliary swivel joint, first and second load arms connected by said auxiliary swivel joint and supported horizontally and co-axially with the fluid supplying pipe, wherein the fluid supplying pipe and the second load arm are maintained immovable, while the first load arm is capable of reversible rotation, and a rotating means driving the first load arm to reversibly rotate, the swivel joint under the test being attached by the first conduit element to the fluid supplying pipe and by the second conduit element to the first load arm, such that, during the test, the second conduit of the swivel joint under the test is continuously rotated a predetermined number of rotational cycles, such that the direction of rotation is reversed after a predetermined time period.

12. The apparatus of claim 11, wherein said rotating means includes a reversible motor mounted on the platform, a gear on the first load arm, and means between the reversible motor and the gear for reducing the motor speed to a rotational speed required for the test.

13. The apparatus of claim 12, wherein the reversible motor is a 1 HP motor rotating at 1450 rpm, and wherein the rotation of the motor is conveyed to the gear on the first load arm through a 3:1 reduction gear, speed reduction form gear box and a chain drive, in sequence, such that the second conduit element of the swivel joint under the test is rotated at 4 rpm.

14. The apparatus of claim 11, wherein said first and second conduit elements constitute a male and female conduit elements, and wherein the swivel joint under the test further includes:

a main seal, and a removable plug within the female conduit element maintaining the main seal in proper position for bridging said clearance between the female and male conduit elements, such that the plug is easily removed once the main seal is to be replaced, and is installed back in place once the main seal has been replaced.

15. The swivel joint of claim 14, wherein the male conduit element includes a generally cylindrical inner member having an outer surface and further having a first passage portion extending axially therethrough;

wherein the female conduit element includes a generally cylindrical outer member having first and second internal bores extending axially therethrough a first length and a second length thereof, respectively, the second internal bore being of a larger diameter than the first internal bore, such that the sum of said first length and of said second length constitutes the length of the outer member;

wherein the plug includes a generally cylindrical body and an annular elevated portion integral therewith, a second passage portion extending axially therethrough, wherein the generally cylindrical body has a first outer surface and an upper surface, and wherein the annular elevated portion has a second outer surface;

wherein, when the first internal bore of the female conduit element receives the inner member of the male conduit element and the second internal bore of the female element receives the general cylindrical body of the plug, then said first passage portion in the male conduit element in communication with said second passage portion in the plug define a continuous passage for the fluid to be transformed through said swivel joint.

16. The swivel joint of claim 15, wherein at least one bearing element is provided between the inner member of the male conduit element and the outer member of the female conduit element for rotatably engagement therebetween, wherein said clearance is formed between the outer surface of the inner member of the male conduit element and said first internal bore of the outer element of the female conduit element, wherein said at least one bearing element may be contaminated by the fluid transported through the swivel joint entering said clearance, wherein the inner member of the male conduit element has a proximal end, and wherein the main seal is-supported by the removable plug in tight sealing engagement between the upper surface of the cylindrical body of the plug and the proximal end of the inner member of the male conduit element, and between the second outer surface of the annular elevated portion of the cylindrical body of the plug and the first internal bore within the outer member of the female conduit element, such that the main seal prevents the fluid transported through the swivel joint from entering said clearance.

17. The swivel joint of claim 15, wherein the main seal is a lip-type seal comprising a substantially annular body made of an elastomeric material surrounding the annular elevated portion of the removable body and having an inward lip portion and an outer lip portion, such that the inward lip portion faces the second outer surface of the annular elevated portion of the plug, and such that the outer lip portion engages the first internal bore of the outer member of the female conduit element.

18. The swivel joint of claim 16, wherein said inner member of the male conduit element includes a distal end spaced from said proximal end thereof, wherein a first annular flange is provided at said distal end, wherein said outer member of the female conduit element has first and second ends, said first end engaging said first annular flange, wherein a second seal is provided between the first annular flange of the male conduit element and the first end of the outer member of the female conduit element preventing an outer contamination from entering to said at least one bearing element.

19. The swivel joint of claim 15, wherein said first outer surface of the cylindrical body of the plug is provided with external threads, and wherein a second internal bore of the outer member of the female conduit element is provided with internal threads, such that the removable plug threadably engages the female conduit element.

20. The swivel joint of claim 18, wherein the swivel joint interconnects pipe sections of articulated fluid transfer equipment, wherein said second end of the outer member of the female conduit element includes a second annular flange, and wherein said first and second annular flanges .engage respective pipe sections to be connected.

21. The swivel joint of claim 16, wherein said at least one bearing element is a ball bearing system.

22. The swivel joint of claim 16, wherein said at least one bearing element is a roller bearing system.

23. The swivel joint of claim 16, wherein said at least one bearing element includes ball-and-roller bearing system.

24. The swivel joint of claim 14, wherein the removable plug is an integral member made either of carbon steel, stainless steel or an alloyed material.

25. The apparatus of claim 11, further including means for supplying the fluid to the swivel joint under the test through the fluid supply pipe under a required pressure.

26. The apparatus of claim 25, further including a first pressure gauge monitoring the pressure of the fluid in the swivel joint under the test.

27. The apparatus of claim 26 further comprising a controlling means switching the motor "OFF" after a predetermined period of time.

28. The apparatus of claim 27, wherein the jack at the second end of the platform is a hydraulic jack which provides a predetermined mechanical load applied to the swivel joint under the test, and wherein a second pressure gauge monitors said mechanical load.

29. The apparatus of claim 11, further comprising a means to count a number of rotational cycles the swivel joint has been subjected to.

30. The apparatus of claim 29, further comprising a controlling means reversing the motor after a predetermined number of said rotational cycles.

31. The apparatus of claim 11, wherein the first load arm is provided with a blind flange for being attached to the second conduit element of the swivel joint under the test.

32. The apparatus of claim 11, wherein the predetermined number of rotational cycles during the continuous rotation of the second conduit element of the swivel joint is indicative of a required life cycle thereof.

33. The method for measuring leakage of a fluid from a swivel joint following the useful life of such swivel joint, wherein coaxial rotating male and female conduit elements have a sealed clearance therebetween, and wherein the fluid is supplied under a certain pressure while a predetermined mechanical load is applied to the swivel joint, the improvement which comprises the steps of rotating the swivel joint in a reverse direction after five or ten minutes at 4 rpm, supplying the fluid to the swivel joint under a pressure of 275 psi, and applying a mechanical pressure of three tons to the swivel joint; and wherein said test method further comprises the steps of providing an auxiliary swivel joint, a first load arm attached to the swivel joint at one end, a second load arm joined with the other end of such first load arm through the auxiliary swivel joint, and a hydraulic jack to support the second load arm and deliver the mechanical load to the swivel joint through such first and second load arms.

* * * * *

UNITED STATES PATENT AND TRADEMARK OFFICE
CERTIFICATE OF CORRECTION

PATENT NO. : 5,753,799
DATED : May 19, 1998
INVENTOR(S) : Shah

It is certified that error appears in the above-identified patent and that said Letters Patent is hereby corrected as shown below:

Column 8, line 54, "The area of the piston=$\pi$ =n/4 d$^2$ = 0.7854 d$^2$" should read ---the area of the piston =a=$\pi$/4d$^2$ =0.7854d$^2$---.

Signed and Sealed this

Twenty-ninth Day of June, 1999

*Attest:*

Q. TODD DICKINSON

*Attesting Officer*     *Acting Commissioner of Patents and Trademarks*